United States Patent
Salomäki et al.

(10) Patent No.: US 8,816,619 B2
(45) Date of Patent: Aug. 26, 2014

(54) MOTOR CONTROL SYSTEM FOR A HOIST DRIVE

(75) Inventors: Janne Salomäki, Hyvinkää (FI); Mikko Porma, Vantaa (FI)

(73) Assignee: Konecranes PLC, Hyvinkää (FI)

( * ) Notice: Subject to any disclaimer, the term of this patent is extended or adjusted under 35 U.S.C. 154(b) by 314 days.

(21) Appl. No.: 13/508,829

(22) PCT Filed: Nov. 30, 2010

(86) PCT No.: PCT/FI2010/050982
§ 371 (c)(1),
(2), (4) Date: May 30, 2012

(87) PCT Pub. No.: WO2011/067467
PCT Pub. Date: Jun. 9, 2011

(65) Prior Publication Data
US 2012/0229062 A1 Sep. 13, 2012

(30) Foreign Application Priority Data
Dec. 1, 2009 (EP) .................................. 09177587

(51) Int. Cl.
H02P 6/16 (2006.01)
H02P 23/00 (2006.01)
B66D 1/46 (2006.01)

(52) U.S. Cl.
CPC ........ *H02P 23/0036* (2013.01); *H02P 23/0077* (2013.01); *B66D 1/46* (2013.01)
USPC .................................................... 318/400.04

(58) Field of Classification Search
CPC ............. H02P 6/06; H02P 6/182; H02P 6/16; H02P 6/14; H02P 6/08
USPC ................................ 318/400.04, 400.01, 700
See application file for complete search history.

(56) References Cited

U.S. PATENT DOCUMENTS

| | | | | |
|---|---|---|---|---|
| 3,911,339 A * | 10/1975 | Rettig | ........................... | 318/701 |
| 3,962,614 A * | 6/1976 | Rettig | ........................... | 318/801 |
| 4,599,549 A * | 7/1986 | Mutoh et al. | .................. | 318/798 |
| 4,629,035 A * | 12/1986 | Tanahashi et al. | ............ | 187/296 |
| 4,683,412 A * | 7/1987 | Bialek et al. | .................. | 318/798 |
| 4,719,995 A * | 1/1988 | Ikejima | ......................... | 187/296 |
| 5,039,028 A * | 8/1991 | Svedlund et al. | ............. | 254/275 |
| 5,894,910 A * | 4/1999 | Suur-Askola et al. | ........ | 187/290 |
| 2002/0144968 A1 * | 10/2002 | Ruddy | .......................... | 212/278 |

FOREIGN PATENT DOCUMENTS

| | | |
|---|---|---|
| EP | 0259656 A1 | 3/1988 |
| GB | 945655 | 1/1964 |
| JP | 9-182498 A | 7/1997 |

* cited by examiner

*Primary Examiner* — Shawki S Ismail
*Assistant Examiner* — Zoheb Imtiaz
(74) *Attorney, Agent, or Firm* — Birch, Stewart, Kolasch & Birch, LLP

(57) ABSTRACT

A motor control system for a hoist drive having an electric motor operationally connected to a hoisting member for hoisting a load, the motor control system being adapted to generate a final angular frequency reference ($\omega^*_s$) for control of the electric motor, the motor control system comprising a power limiter means adapted to generate a correction term ($\omega_{s,cor}$) for angular frequency reference. The power limiter means comprises an integrating controller means, the power limiter means being adapted to generate the correction term ($\omega_{s,cor}$) for angular frequency reference using output signal $I_P$ of the integrating controller means, initial data of the integrating controller means including information relating to actual value of the power of the electric motor and a power related limit value of the electric motor.

15 Claims, 4 Drawing Sheets

MOTOR CONTROL SYSTEM FOR A HOIST DRIVE

BACKGROUND OF THE INVENTION

The present invention relates to a motor control system for a hoist drive according to the preamble of independent claim 1.

In order to maintain stable operation of a host drive, a rotation speed of the electric motor of the hoist drive must be limited such that the slip frequency does not exceed the pull-out slip frequency. In other words, the pull-out torque must not be reached. The pull-out torque decreases as the inverse square of the speed, so the pull-out torque is reached more easily at high speeds than at low speeds.

A prior art motor control system for a hoist drive is adapted to use load weighing data obtained from a load weighing sensor for limiting the rotation speed of the electric motor of the hoist drive. Load weighing sensors adapted to output load weighing data are relatively expensive components.

BRIEF DESCRIPTION OF THE INVENTION

An object of the present invention is to provide a motor control system for a hoist drive that is capable of limiting the rotation speed of the electric motor of the hoist drive below the pull-out slip frequency without load weighing data. The object of the invention is achieved by a motor control system for a hoist drive which is characterized by what is stated in the independent claim 1. The preferred embodiments of the invention are disclosed in the dependent claims.

The invention is based on the idea of generating a correction term for angular frequency reference with power limiter means comprising integrating controller means which uses as its initial data information relating to actual value of the power of the electric motor.

An advantage of the motor control system of the invention is that the motor control system does not need any measurement data relating to the weight of the load. Another advantage is that the motor control system can reliably keep the slip frequency below the pull-out slip frequency.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
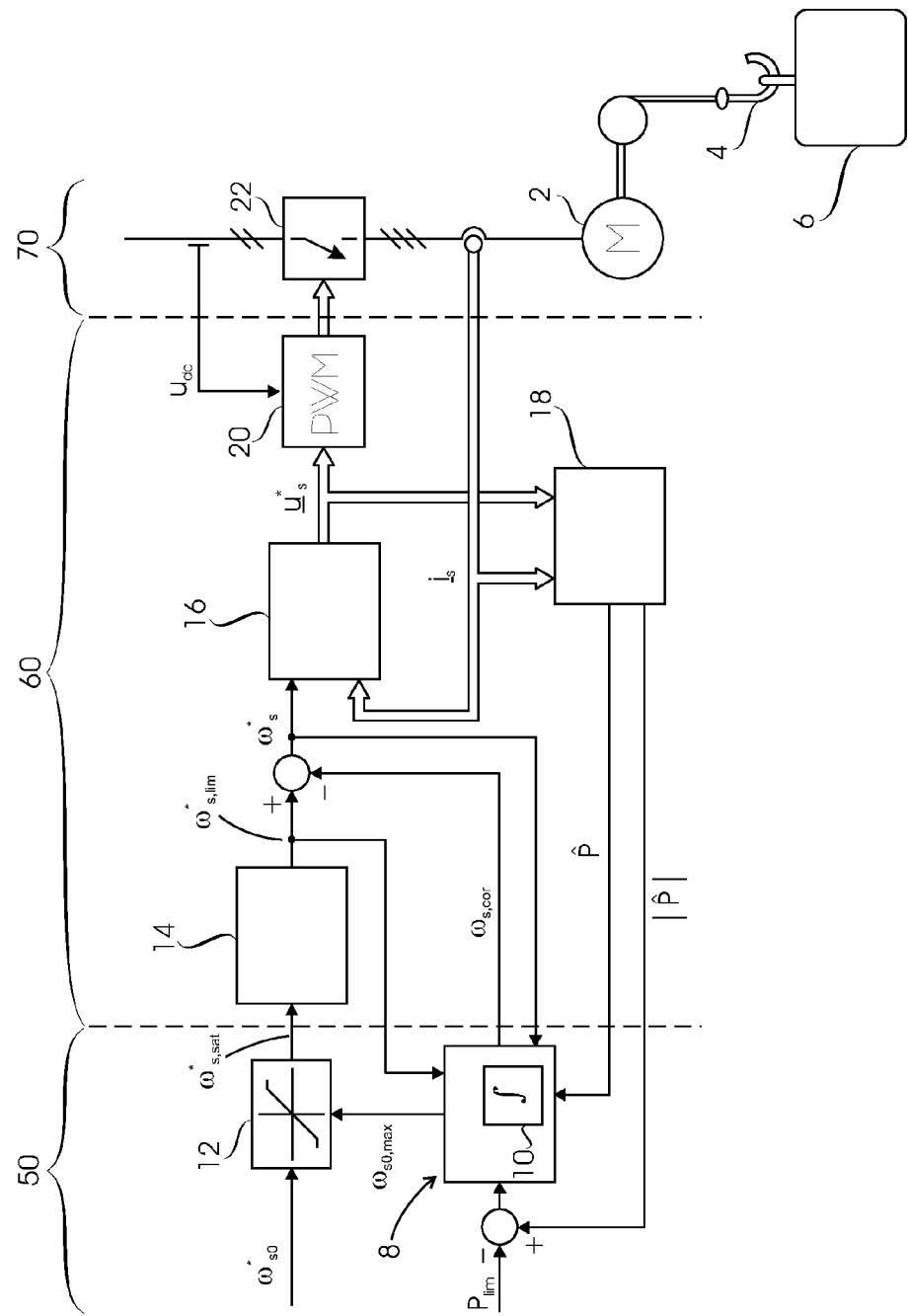
FIG. 1 shows an open-loop hoist drive comprising a motor control system according to an embodiment of present invention.

FIG. 1 shows an open-loop hoist drive comprising an electric motor 2 operationally connected to a hoisting member 4 for hoisting a load 6. The electric motor 2 is controlled by a motor control system according to an embodiment of present invention. The motor control system comprises power limiter means 8, saturation means 12, rate limiter means 14, control means 16, power estimator means 18, and pulse width modulation means 20. The motor control system is adapted to generate a final angular frequency reference $\omega^*_s$ for control of the electric motor 2 based on initial data comprising a limited set point value $\omega^*_{s,lim}$ for angular frequency reference and a correction term $\omega_{s,cor}$ for angular frequency reference. In the open-loop embodiment of FIG. 1, the final angular frequency reference $\omega^*_s$ is a synchronous angular frequency reference and the control means 16 is a scalar control means.

In FIG. 1 the open-loop hoist drive has been divided into three segments, namely an application software 50, a system software 60 and a hoist drive equipment 70. The application software and the system software are adapted to be carried out by an appropriate data-processing equipment. In addition to above listed electric motor 2 and hoisting member 4 the hoist drive equipment comprises a frequency converter 22. The entire hoist drive equipment may be composed of known components.

The saturation means 12 is adapted to receive an initial angular frequency reference $\omega^*_{s0}$ generated by user interface means. The saturation means 12 is adapted to generate an saturated angular frequency reference $\omega^*_{s,sat}$ by imposing an upper limit $\omega_{s0,max}$ and a lower limit $\omega_{s0,min}$ on the initial angular frequency reference $\omega^*_{s0}$. When the initial angular frequency reference $\omega^*_{s0}$ is within the range specified by the lower limit and the upper limit, the saturated initial angular frequency reference $\omega^*_{s,sat}$ is equal to the initial angular frequency reference $\omega^*_{s0}$. When the initial angular frequency reference $\omega^*_{s0}$ greater than the upper limit $\omega_{s0,max}$ the saturated initial angular frequency reference $\omega^*_{s,sat}$ is equal to the upper limit $\omega_{s0,max}$. Correspondingly, when the initial angular frequency reference $\omega^*_{s0}$ is lower than the lower limit $\omega_{s0,min}$ the saturated initial angular frequency reference $\omega^*_{s,sat}$ is equal to the lower limit $\omega_{s0,min}$. The lower limit $\omega_{s0,min}$ may be the additive inverse of the upper limit $\omega_{s0,max}$, wherein the absolute values of the upper and lower limits are equal. In an alternative embodiment the saturation means may be adapted to impose only a lower limit or only an upper limit on the initial angular frequency reference.

The saturation means 12 is adapted to feed the saturated initial angular frequency reference $\omega^*_{s,sat}$ into rate limiter means 14 as the input signal of the rate limiter means 14. The rate limiter means 14 is adapted to generate the limited set point value $\omega^*_{s,lim}$ for angular frequency reference by limiting the first derivative of the saturated initial angular frequency reference $\omega^*_{s,sat}$.

The rate limiter means 14 is implemented in the system software as follows $$\Delta_{\omega s} = \frac{\omega^*_{s,in}(n) - \omega^*_{s,lim}(n-1)}{T_s}$$

$$\omega^*_{s,lim}(n) = \begin{cases} \omega^*_{s,lim}(n-1) + \text{sign}(\Delta_{\omega s})T_s\Delta_{max}, & \text{if } |\Delta_{\omega s}| > \Delta_{max} \\ \omega^*_{s,in}(n), & \text{otherwise} \end{cases}$$

where $\omega^*_{s,in}$ is the input of the rate limiter means 14, $T_s$ is the sampling interval, $\Delta_{\omega s}$ is the unlimited rate of change of the angular frequency reference, and $\Delta_{max}$ is the maximum rate of change of the angular frequency. The notation $\omega^*_{s,lim}(n)$ denotes the current value and $\omega^*_{s,lim}(n-1)$ denotes the previous value.

The implementation of the rate limiter means 14 results in the same absolute value of the rate of change for the rising and falling edges. In an alternative embodiment the absolute value of the rate of change for the rising edge may be different from the absolute value of the rate of change for the falling edge.

The power limiter means 8 comprises integrating controller means 10 adapted to generate an output signal $I_P$. The power limiter means 8 is adapted to generate the correction term $\omega_{s,cor}$ for angular frequency reference with equation $$\omega_{s,cor} = \text{sign}(\omega^*_{s,lim})I_P,$$

wherein "sign" is a signum function that extracts the sign of a real number. In other words the absolute value of the correction term $\omega_{s,cor}$ equals the output signal of the integrating controller means 10, and the sign of the correction term $\omega_{s,cor}$ depends on sign of the limited set point value $\omega^*_{s,lim}$ for angular frequency reference. In order to avoid an algebraic loop, a previous value of the limited set point value $\omega^*_{s,lim}$ for angular frequency reference should be used when calculating the correction term $\omega_{s,cor}$ for angular frequency reference with above equation.

The final angular frequency reference $\omega_s$ is obtained by subtracting the correction term $\omega_{s,cor}$ for angular frequency reference from the limited set point value $\omega_{s,lim}$ for angular frequency reference, as defined in equation $$\omega^*_s = \omega^*_{s,lim} - \omega_{s,cor}.$$

The final angular frequency reference $\omega^*_s$ is inputted into the control means 16 for calculation of a stator voltage reference $\underline{u}^*_s$ and into the power limiter means 8 for calculation of a dynamic power $\hat{P}_{dyn}$ of the electric motor.

The control means 16 is adapted to generate, using some known method, the stator voltage reference $\underline{u}^*_s$ based on the final angular frequency reference $\omega^*_s$ and a measured stator current $\underline{i}_s$. Both the measured stator current $\underline{i}_s$ and the stator voltage reference $\underline{u}^*_s$ are space vectors representing three phase quantities. The control means 16 is adapted to input the stator voltage reference $\underline{u}^*_s$ into the power estimator 18 for calculation of estimated real power $\hat{P}$ of the electric motor 2, and into the pulse width modulation means 20 for pulse width modulation of input voltage of the electric motor 2.

In addition to the correction term $\omega_{s,cor}$ for angular frequency reference, the power limiter means 8 is also adapted to generate the upper limit $\omega_{s0,max}$ for the initial angular frequency reference based on the limited set point value $\omega^*_{s,lim}$ for angular frequency reference and the output signal $I_P$ of the integrating controller means 10. The upper limit $\omega_{s0,max}$ is chosen as follows:

$$\omega_{s0,max} = \begin{cases} |\omega^*_{s,lim}|, & \text{if } I_P > 0 \\ \omega_{s,max}, & \text{otherwise} \end{cases}$$

where $\omega_{s,max}$ is a predetermined maximum angular frequency of the electric motor 2. In order to avoid an algebraic loop, a previous value of the limited set point value $\omega^*_{s,lim}$ for angular frequency reference should be used in above equation.

Initial data of the integrating controller means 10 include an absolute value of an estimated real power $\hat{P}$ of the electric motor, a power limit $P_{lim}$ of the electric motor, and dynamic power $\hat{P}_{dyn}$ of the electric motor. The output $I_P$ of the integrating controller means 10 is calculated with equation $$I_P = k_{ip} \int (|\hat{P}| - P_{lim} + \hat{P}_{dyn}) dt, \quad I_P \geq 0$$

where $k_{ip}$ is the gain of the integrating controller means 10. The output $I_P$ of the integrating controller means 10 is always greater than or equal to zero. This means that if above integral function returns a value less than a zero, the integrating controller means 10 delimits the output $I_P$ to zero.

The estimated real power $\hat{P}$ of the electric motor is obtained as an output of the power estimator 18. The dynamic power $\hat{P}_{dyn}$ of the electric motor is calculated as follows $$\hat{P}_{dyn} = \begin{cases} \dfrac{J}{p^2} \dfrac{d\omega^*_s}{dt} \omega^*_s, & \text{if } \hat{P} < 0 \\ 0, & \text{otherwise} \end{cases}$$

where J is the inertia of the electric motor 2, and p is the number of pole pairs of the electric motor 2. Above equation shows that the dynamic power $\hat{P}_{dyn}$ is nonzero only in the regeneration mode of the hoist drive. Compensating the dynamic power helps reducing the risk of the real power of the electric motor exceeding its limit when the acceleration ends in the regeneration mode.

The power estimator means 18 is adapted to calculate the estimated real power $\hat{P}$ of the electric motor 2 based on the measured stator current $\underline{i}_s$ and the stator voltage reference $\underline{u}^*_s$ generated by the control means 16. Methods for calculating estimated real power are well known in the art. The difference between the absolute value of the estimated real power $\hat{P}$ and the power limit $P_{lim}$ of the electric motor is inputted into the power limiter means 10.

In the motor control system shown in FIG. 1 the power limiter means 8 is adapted to generate the correction term $\omega_{s,cor}$ for angular frequency reference based on real power values relating to the electric motor 2. This means the disclosed embodiment limits the real power of the electric motor. One skilled in the art knows that it is also possible to limit the current of the electric motor or, when using an induction motor, to limit the slip of the motor. Herein expression "information relating to actual value of the power of the electric motor" encompasses information relating to real power, current and slip. In embodiments adapted to limit the current of the electric motor, the power limit $P_{lim}$ is replaced with a current limit. Correspondingly, in embodiments adapted to limit the slip of the electric motor, the power limit $P_{lim}$ is replaced with a slip limit. Each of the power limit, the current limit and the slip limit is a power related limit value of the electric motor in the corresponding embodiment.

Initial data of the pulse width modulation means 20 comprise the stator voltage reference $\underline{u}^*_s$ and a measured input direct voltage $u_{dc}$ of a frequency converter 22 adapted to supply the electric motor 2. Both pulse width modulators and frequency converters are well known in the art, and are therefore not discussed herein.

In the embodiment of FIG. 1, the power limiter means 8, the integrating controller means 10, the saturation means 12, the rate limiter means 14, the control means 16, the power estimator means 18 and the pulse width modulation means 20 are software components adapted to perform certain method steps when executed on a data processing apparatus. In an alternative embodiment, the power limiter means 8, the integrating controller means 10, the saturation means 12, the rate limiter means 14, the control means 16, the power estimator means 18 and the pulse width modulation means 20 may comprise firmware components and/or hardware components.

Figure 2:
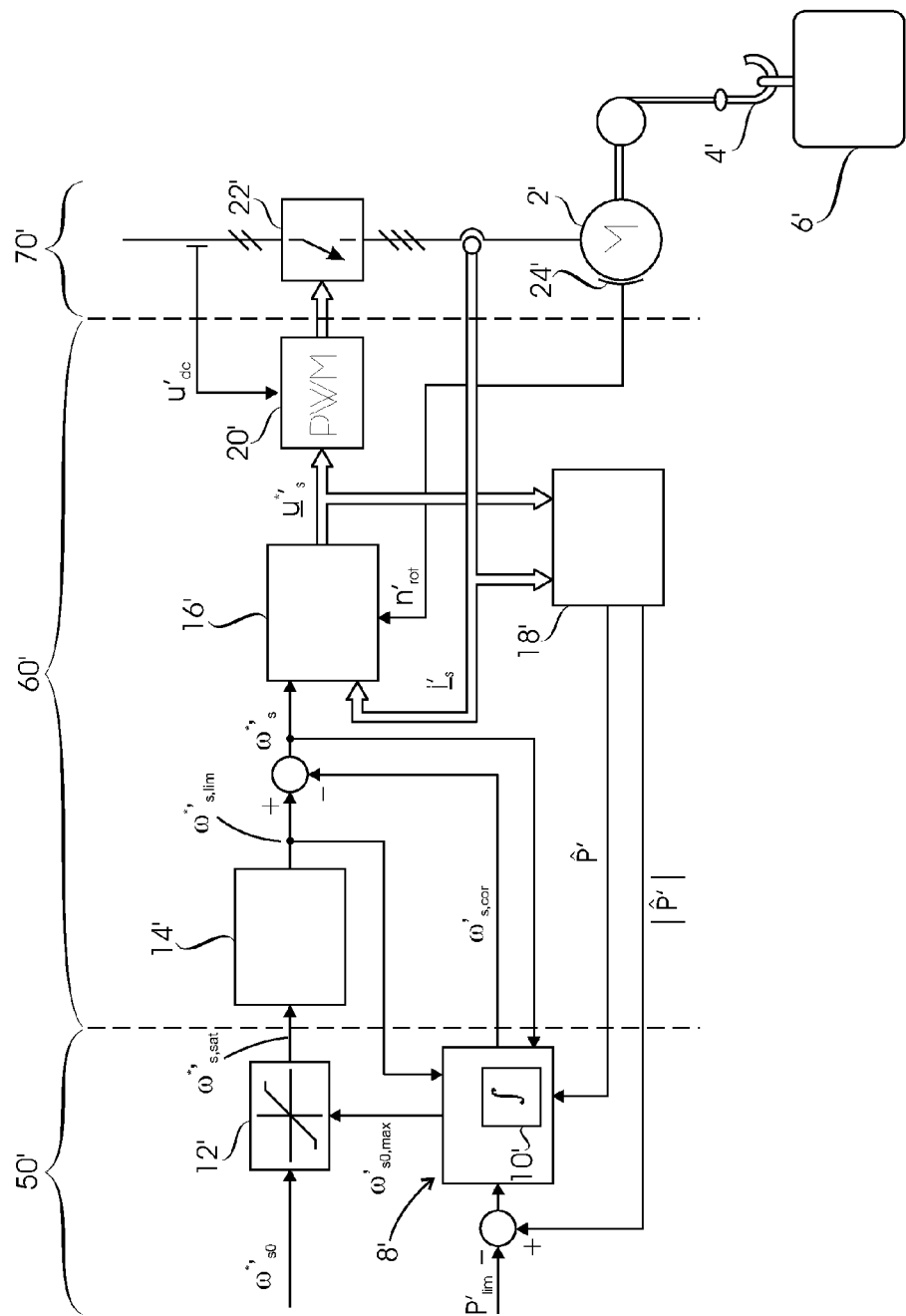
FIG. 2 shows a closed-loop hoist drive comprising a motor control system according to another embodiment of present invention.

FIG. 2 shows a closed-loop hoist drive comprising an electric motor 2' operationally connected to a hoisting member 4' for hoisting a load 6'. The electric motor 2' is controlled by a motor control system according to a closed-loop embodiment of present invention. The motor control system comprises power limiter means 8', saturation means 12', rate limiter means 14', control means 16', power estimator means 18', a pulse width modulation means 20' and a speed sensor 24'. The motor control system is adapted to generate a final angular frequency reference $\omega^*_s$ for control of the electric motor 2' based on initial data comprising a limited set point value $\omega^{*'}_{s,lim}$ for angular frequency reference and a correction term $\omega'_{s,cor}$ for angular frequency reference. In the closed-loop embodiment of FIG. 2, the final angular frequency reference $\omega^{*'}_s$ is a rotation speed reference and the control means 16' is a vector control means.

Corresponding components in the open-loop hoist drive of FIG. 1 and the closed-loop hoist drive of FIG. 2 have been denoted by same reference signs, with the exception that an apostrophe (') has been added to the reference signs referring to the closed-loop hoist drive of FIG. 2. It can be seen that the closed-loop hoist drive of FIG. 2 is quite similar to the open-loop hoist rive of FIG. 1. Comparing the closed-loop hoist drive of FIG. 2 with the open-loop hoist drive of FIG. 1 reveals that the only completely new component is the speed sensor 24' which detects the actual value of the rotation speed $n'_{rot}$ of the electric motor 2'. The speed sensor 24' is adapted to input the actual value of the rotation speed $n'_{rot}$ of the electric motor 2' into the control means 16' for vector control of the electric motor 2'. The control means 16' includes a speed controller and a vector controller.

The closed-loop hoist drive of FIG. 2 generates the final angular frequency reference $\omega^{*'}_s$ with the same equations as the open-loop hoist drive of FIG. 1 generates its final angular frequency reference $\omega^*_s$. Therefore all that has been said above about the algorithm for generating the final angular frequency reference $\omega^*_s$ of an open-loop hoist drive applies also to closed-loop hoist drives.

Figure 3:
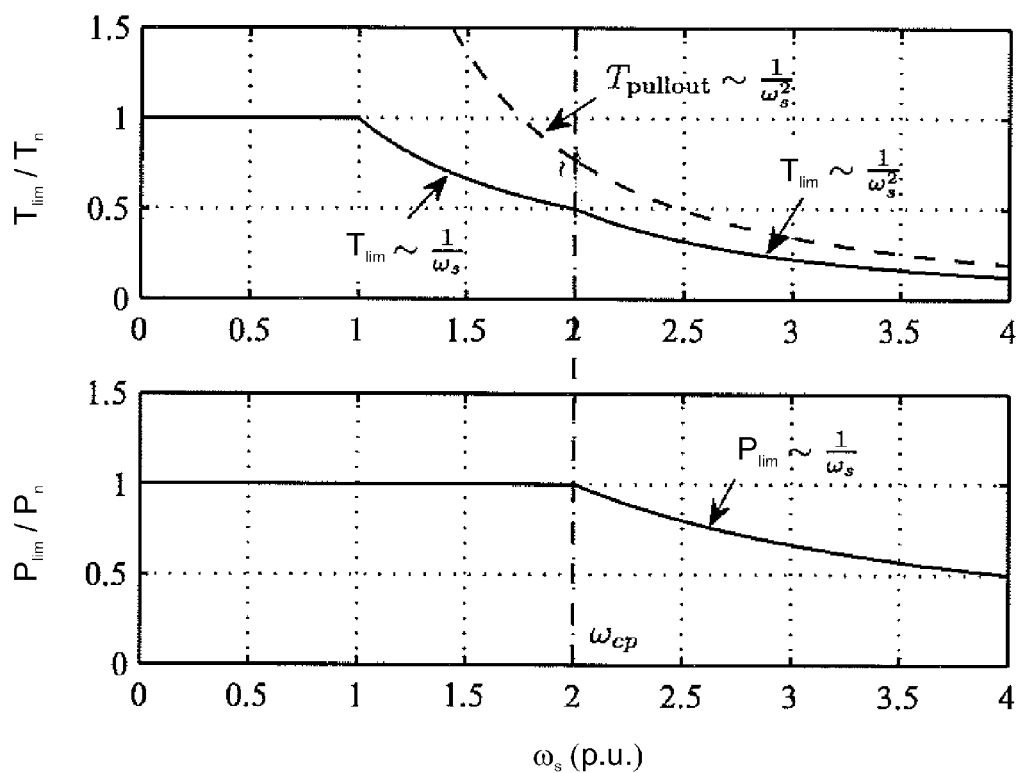
FIG. 3 shows a torque limit and a power limit of the hoist drive of FIG. 1.

FIG. 3 shows a torque limit $T_{lim}$ and a power limit $P_{lim}$ of the hoist drive of FIG. 1 as a function of a stator frequency $\omega_s$ of the electric motor 2. The stator frequency $\omega_s$ is depicted as a per unit value, i.e. as a quotient of an actual stator frequency and the nominal stator frequency. FIG. 3 illustrates the influence of the power limit $P_{lim}$ on the torque limit $T_{lim}$. In practice said influence is significant only at high angular frequencies. At low frequencies, the torque is usually limited by the maximum current. The forms of the plots depicted in FIG. 3 are merely examples.

The lower subplot of FIG. 3 shows that when the stator frequency $\omega_s$ of the electric motor 2 is below a hoisting threshold frequency point $\omega_{cp}$, the power limit $P_{lim}$ is equal to the nominal power $P_n$ of the electric motor 2. When the stator frequency $\omega_s$ of the electric motor 2 is above the hoisting threshold frequency point $\omega_{cp}$, the power limit $P_{lim}$ drops approximately inversely proportional to the stator frequency $\omega_s$. The upper subplot of FIG. 3 shows that when the stator frequency $\omega_s$ of the electric motor 2 is less than nominal, the torque limit is equal to the nominal torque $T_n$ of the electric motor 2. When the stator frequency $\omega_s$ of the electric motor 2 is above the nominal but below the hosting threshold frequency point $\omega_{cp}$, the torque limit $T_{lim}$ drops approximately inversely proportional to the stator frequency $\omega_s$ due to the constant value of the power limit $P_{lim}$. When the stator frequency $\omega_s$ of the electric motor 2 is above the hoisting threshold frequency point $\omega_{cp}$, the torque limit $T_{lim}$ drops approximately inversely proportional to the square of the stator frequency $\omega_s$ due to the decreasing power limit $P_{lim}$. Therefore a safe margin to the pull-put torque $T_{pullout}$ is maintained. The upper subplot of FIG. 3 shows that the torque limit $T_{lim}$ is always clearly below the pull-out torque $T_{pullout}$, which drops approximately inversely proportional to the square of the stator frequency $\omega_s$.

The plots depicted in FIG. 3 are only examples. In the plots of FIG. 3 the hoisting threshold frequency point $\omega_{cp}$ is twice the nominal stator frequency of the electric motor 2. In an alternative embodiment the hoisting threshold frequency point may have a different value.

In an alternative embodiment the torque limit has a different value than the nominal torque of the electric motor when the stator frequency of the electric motor is less than nominal. The border between the constant torque limit and the inversely dropping torque limit may also be located differently than in FIG. 3. Further, the torque limit does not have to be constant at any stator frequency range.

In an alternative embodiment the power limit has a different value than the nominal power of the electric motor when the stator frequency of the electric motor is less than the hoisting threshold frequency point. Further, the power limit does not have to be constant at frequency range below the hoisting threshold frequency point. One skilled in the art understands the relationship between the torque limit and the power limit, and therefore the relationship is not discussed herein.

The plots of FIG. 3 relate to a hoisting event. In one embodiment, plots relating to a lowering event are mirror images of plots relating to a hoisting event. For example, a lowering plot obtained by mirror imaging the lower subplot of FIG. 3 would have a lowering threshold frequency point at $\omega_s=-2$ (p.u.), below which the power limit $P_{lim}$ would drop approximately inversely proportional to the stator frequency $\omega_s$. In an alternative embodiment the lowering plots of a hoist drive are not mirror images of hoisting plots of the hoist drive. The power limit $P_{lim}$ is always greater than zero, both during a hoisting event and during a lowering event.

In an alternative embodiment plots relating to lowering event are not mirror imagines of plots relating to hoisting event. The lowering threshold frequency point may have a different absolute value than the hoisting threshold frequency point. At frequency range between zero and the lowering threshold frequency point he absolute value of the power limit may be different than absolute value of the power limit between zero and the hoisting threshold frequency point.

The plots of FIG. 3 have the stator frequency $\omega_s$ as the axis of abscisses, or x-axis. However, one understands that the stator frequency $\omega_s$ is approximately equal to the final angular frequency reference $\omega^*_s$ since a typical frequency converter is able to follow its frequency reference quite closely.

Figure 4:
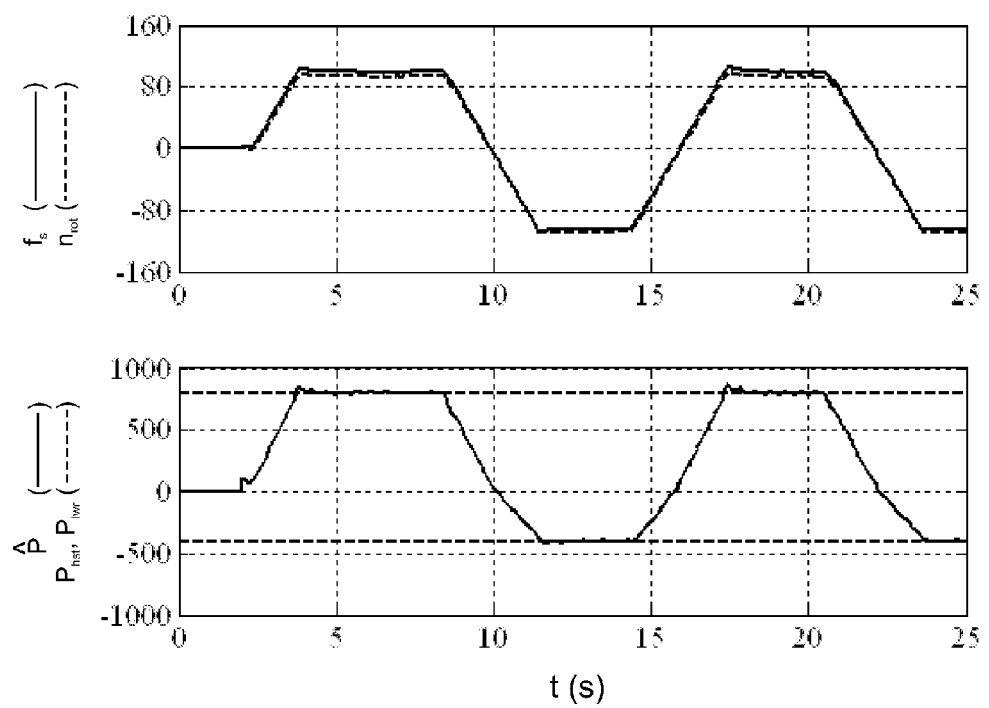
FIG. 4 shows measurement results obtained using the hoist drive according to FIG. 1.

FIG. 4 shows measurement results obtained using the hoist drive according to FIG. 1. The upper subplot shows the stator frequency $f_s$ and the actual value of the rotation speed $n_{rot}$ of the electric motor 2 as a function of time. The unit of the stator frequency $f_s$ and the actual value of the rotation speed $n_{rot}$ of the electric motor 2 is hertz, or cycle per second. The lower subplot shows the estimated real power $\hat{P}$ of the electric motor 2 as a function of time. The lower subplot also shows a hoisting power limit $P_{hst}$ and a lowering power limit $P_{lwr}$.

The lower subplot of FIG. 4 shows that the absolute value of the hoisting power limit $P_{hst}$ is higher than the absolute value of the lowering power limit $P_{lwr}$. The hoisting power limit $P_{hst}$ is 80% of the nominal power of the electric motor 2. The absolute value of the lowering power limit $P_{lwr}$ is 40% of the nominal power of the electric motor 2. In FIG. 4 a hoisting speed has been given a positive sign and a lowering speed has been given a negative sign.

The hoisting power limit $P_{hst}$ is the value of the power limit $P_{lim}$ during the hoisting events of FIG. 4. During the lowering events of FIG. 4 the power limit $P_{lim}$ is equal to the absolute value of the lowering power limit $P_{lwr}$. The power limit $P_{lim}$ was constant, i.e. equal to the hoisting power limit $P_{hst}$ during the hoisting events because the stator frequency $\omega_s$ was all the time below the hoisting threshold frequency point $\omega_{cp}$. Correspondingly, the power limit $P_{lim}$ was equal to the absolute value of the lowering power limit $P_{lwr}$, during the lowering events because the stator frequency $\omega_s$ was all the time above the lowering threshold frequency point. The stator frequency $\omega_s$ being above the lowering threshold frequency point means that the absolute value of the stator frequency $\omega_s$ is less than the absolute value of the lowering threshold frequency point.

The measurement relating to FIG. 4 was made hoisting and lowering a load weighing 6000 kg. The initial angular frequency reference $\omega^*_{s0}$ was 150 Hz during the hoisting events, and −150 Hz during the lowering events. The upper subplot of FIG. 4 shows that thanks to the power limiting action of the power limiter means 8 the actual value of the rotation speed $n_{rot}$ of the electric motor 2 did not rise higher than approximately 100 revolutions per second, or hertz.

It will be obvious to a person skilled in the art that the inventive concept can be implemented in various ways. The invention and its embodiments are not limited to the examples described above but may vary within the scope of the claims.

The invention claimed is:

1. A motor control system for a hoist drive having an electric motor operationally connected to a hoisting member for hoisting a load, the motor control system being adapted to generate a final angular frequency reference for control of the electric motor based on initial data comprising a limited set point value for angular frequency reference and a correction term for angular frequency reference, the motor control system comprising a power limiter adapted to generate the correction term for angular frequency reference, wherein the power limiter comprises an integrating controller, the power limiter being adapted to generate the correction term for angular frequency reference using an output signal $I_P$ of the integrating controller, the correction term for angular frequency reference being proportional to the output signal $I_P$, initial data of the integrating controller including a first variable proportional to actual value of the power of the electric motor and a first parameter proportional to a power limit value of the electric motor, a calculation of the output signal $I_P$ of the integrating controller comprises subtracting said first parameter from said first variable, the output signal $I_P$ of the integrating controller being delimited such that it is always greater than or equal to zero, and the correction term for angular frequency reference being adapted to reduce an absolute value of the final angular frequency reference when the correction term for angular frequency reference differs from zero.

2. A motor control system according to claim 1, wherein the motor control system is adapted to receive an initial angular frequency reference generated by a user interface, and to generate the limited set point value for angular frequency reference based on initial data comprising the initial angular frequency reference.

3. A motor control system according to claim 1, wherein the power limiter is adapted to generate the correction term for angular frequency reference with equation $\omega_{s,cor} = \text{sign}(\omega^*_{s,lim}) I_P$.

4. A motor control system according to claim 1, wherein the first variable proportional to actual value of the power of the electric motor is an absolute value of an estimated real power $\hat{P}$ of the electric motor, and the first parameter proportional to power limit value of the electric motor is power limit $P_{lim}$ of the electric motor.

5. A motor control system according to claim 4, wherein in a regeneration mode the initial data of the integrating controller further includes information relating to a dynamic power $\hat{P}_{dyn}$ of the electric motor.

6. A motor control system according to claim 5, wherein the dynamic power $\hat{P}_{dyn}$ of electric motor is calculated with equation $$\hat{P}_{dyn} = \frac{J}{p^2} \frac{d\omega^*_s}{dt} \omega^*_s,$$

where J is the inertia of the electric motor, and p is the number of pole pairs of the electric motor.

7. A motor control system according to claim 5, wherein in the regeneration mode the output $I_P$ of the integrating controller is calculated with equation $I_P = k_{ip} \int (|\hat{P}| - P_{lim} + \hat{P}_{dyn}) dt \; I_P \geq 0$ wherein $k_{ip}$ is the gain of the integrating controller.

8. A motor control system according to claim 4, wherein the power limit of the electric motor is a function of an angular frequency variable such that the power limit is reduced inversely proportional to the angular frequency variable when the angular frequency variable exceeds a hoisting threshold frequency point, the angular frequency variable being a variable relating to the angular frequency of the electric motor.

9. A motor control system according to claim 8, wherein the angular frequency variable is the final angular frequency reference or an actual value of a stator frequency of the electric motor.

10. A motor control system according to claim 2, wherein the motor control system further comprises a rate limiter adapted to generate the limited set point value for angular frequency reference by limiting the first derivate of the input signal of the rate limiter.

11. A motor control system according to claim 10, wherein the motor control system further comprises a saturation unit adapted to generate an saturated angular frequency reference by imposing an upper limit and a lower limit on the initial angular frequency reference, the saturation unit further being adapted to feed the saturated initial angular frequency reference into the rate limiter as the input signal of the rate limiter.

12. A motor control system according to claim 11, wherein the power limiter is adapted, when the output signal Ip of the integrating controller is greater than zero, to assign to the upper limit for the initial angular frequency reference an value equal to the absolute value of the limited set point value for angular frequency reference, and when the output signal $I_P$ of the integrating controller is zero, to assign to the upper limit for the initial angular frequency reference a predetermined maximum angular frequency of the electric motor.

13. A hoist drive comprising an electric motor, a motor control system and a hoisting member, the electric motor being operationally connected to the hoisting member for hoisting a load, wherein the motor control system includes a motor control system according to claim 1.

14. A method of controlling an electric motor of a hoist drive, the method comprising steps of:
receiving an initial angular frequency reference;
generating a limited set point value for angular frequency reference based on initial data comprising the initial angular frequency reference;
generating a correction term for angular frequency reference using an output signal $I_P$ of an integrating controller, the correction term for angular frequency reference being proportional to the output signal $I_P$, initial data of the integrating controller including a first variable proportional to actual value of the power of the electric motor and a first parameter proportional to a power limit value of the electric motor, wherein calculation of the output signal $I_P$ of the integrating controller comprises subtracting said first parameter from said first variable, the output signal $I_P$ of the integrating controller being delimited such that it is always greater than or equal to zero, and the correction term for angular frequency reference being adapted to reduce an absolute value of the final angular frequency reference when the correction term for angular frequency reference differs from zero; and generating a final angular frequency reference for control of the electric motor based on initial data comprising the limited set point value for angular frequency reference and the correction term for angular frequency reference.

15. A computer program product comprising a non-transitory computer-readable storage medium having computer-executable program instructions stored therein, the computer-executable program instructions, when executed, causing a computer to execute the method of claim 14.

* * * * *